(12) United States Patent
Desjoyaux et al.

(10) Patent No.: US 6,387,252 B1
(45) Date of Patent: *May 14, 2002

(54) COMPACT FILTRATION UNIT FOR SWIMMING POOL BASIN

(75) Inventors: Jean Louis Desjoyaux, L'Etrat; Pierre-Louis Desjoyaux, La Fouillouse; Catherine Jandros, L'Etrat, all of (FR)

(73) Assignee: Piscines Desjoyaux, S.A. (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/666,002

(22) Filed: Sep. 19, 2000

Related U.S. Application Data

(63) Continuation of application No. PCT/FR99/00617, filed on Mar. 18, 1998.

(30) Foreign Application Priority Data

Mar. 23, 1998 (FR) .............................. 98 03790

(51) Int. Cl.$^7$ ................................ E04M 4/00

(52) U.S. Cl. .................. 210/169; 210/416.2; 4/496; 4/509

(58) Field of Search .............. 210/169, 416.2; 4/496, 507, 509

(56) References Cited

U.S. PATENT DOCUMENTS

| | | | | |
|---|---|---|---|---|
| 4,596,656 A | * | 6/1986 | Higginbotham et al. | .... 210/169 |
| 4,749,477 A | * | 6/1988 | McGregor | ............... 210/416.2 |
| 5,202,020 A | * | 4/1993 | Desjoyaux et al. | ...... 210/416.2 |
| 6,138,294 A | * | 10/2000 | Desjoyaux et al. | ......... 210/169 |

FOREIGN PATENT DOCUMENTS

| | | |
|---|---|---|
| DE | 2751114 A | 7/1978 |
| EP | 0145619 | 6/1985 |
| WO | WO 96 12075 | 4/1996 |

* cited by examiner

Primary Examiner—Christopher Upton
(74) Attorney, Agent, or Firm—Wall, Marjama & Bilinski, LLP

(57) ABSTRACT

A filtration unit for a swimming pool having a basin. The unit includes a filtration compartment that communicates with the water in the basin and is secured to a side wall of the pool. The filtration compartment is spaced apart from a pumping compartment by a passageway. The passageway possesses a water-tight wall and sealed connections for the pump's suction and delivery pipes. The two compartments are closed by a lid which has perforations over a third duct compartment that communicates with the pumping compartment whereby ambient air can freely enter the duct. In one application of the invention the unit can be straddle mounted upon the wall of an existing pool. In another application the unit can be integrated into a sidewall of a pool as the pool is being erected.

4 Claims, 4 Drawing Sheets

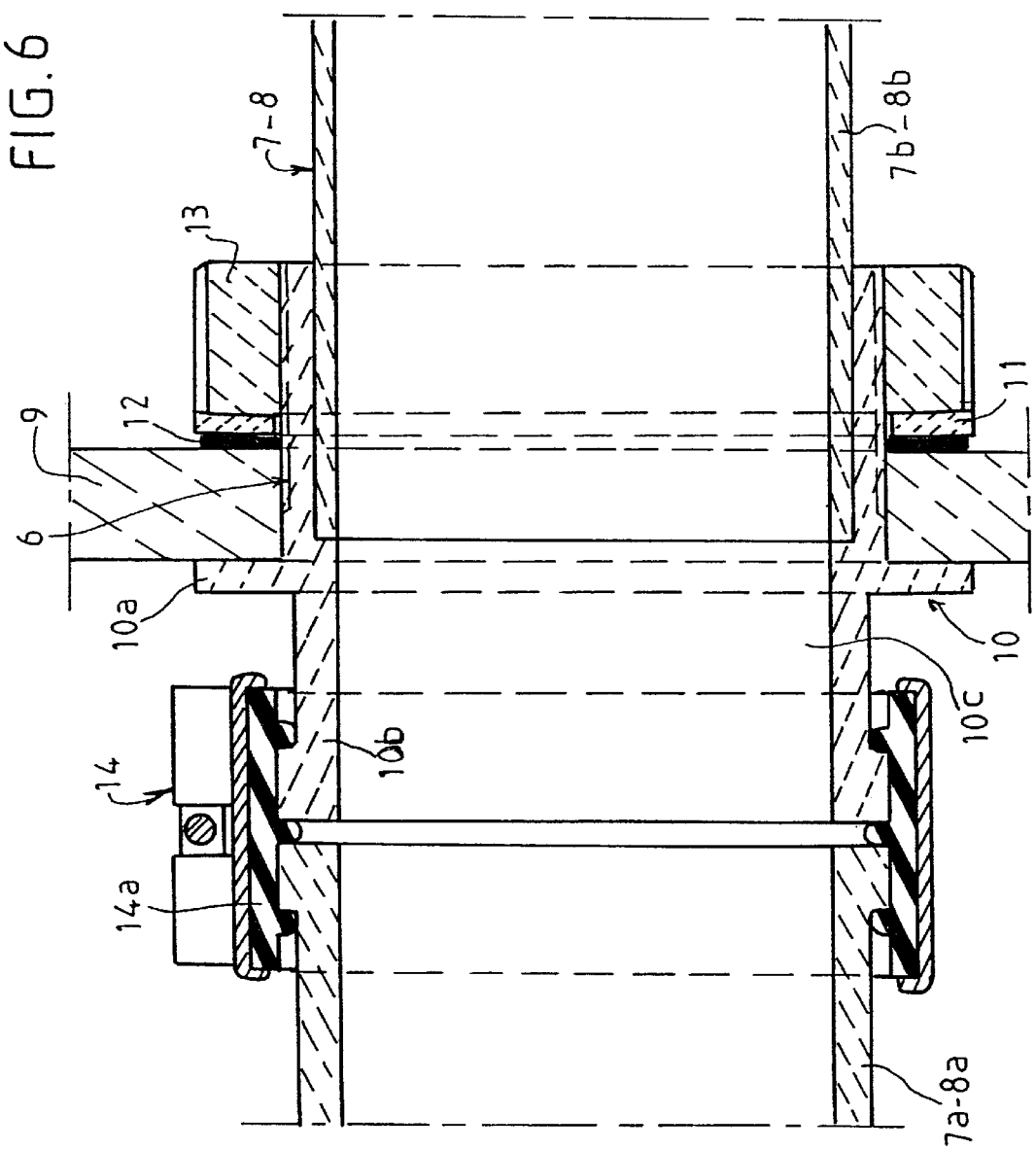

COMPACT FILTRATION UNIT FOR SWIMMING POOL BASIN

This application is a continuation of PCT application FR99/00617, filed Mar. 18, 1998.

BACKGROUND OF THE INVENTION

The invention relates to the technical sector of means for filtering the water in a swimming pool basin.

It is known to use, for the filtration of the water in a swimming pool basin, independent members in the form of compact units incorporating on the one hand the filtration means and on the other hand the pumping means for the suction and delivery of the water. In general, these units comprise a compartment which is immersed in the water and shaped so as to be in communication with that water by means of at least one orifice known by the name of SKIMMER. This compartment accommodates, internally, the various filtration means of any known and appropriate types. The other compartment accommodates the pumping means to allow the suction and delivery of the water in the basin by means of a system of appropriate pipes. The compartment accommodating the pumping means is situated outside the basin of the pool. The two compartments can be linked by attached members or constitute a unitary assembly. In the majority of cases, this unit is shaped in cross section so as to straddle the walls of the basin of the pool.

This unit is therefore intended to be attached and installed after the construction of the pool basin as such. Thus, the suction and delivery pipes between the filtration and pumping means pass above the upper edge of the wall element in question. This type of unit may be illustrated, by way of indication and implying no limitation, by the teaching of Patent FR-A-2544857.

Likewise known are panels or flights designed to perform the functions of filtration, suction and delivery of the water and intended to be installed on panels constituting the whole of the basin of the pool.

This state of the art may be illustrated by the teaching of Patent Application WO 96/12075 which relates to a filtering panel for a swimming pool. This panel is presented in the form of a compact unit consisting of two internal compartments separated by a vertical partition. One of the compartments is arranged to be filled with water and possesses filtration means. The other compartment accommodates means of suction and means to deliver the water in the basin in combination with the means of filtration. This compartment is intended to be positioned outside the swimming pool. The filtration compartment is connected to the water in the basin and has fixing arrangements with panels which make up the walls of the basin of the swimming pool.

It is apparent from this state of the art that the suction and delivery of the water in the basin of the pool, in conjunction with the filtration means, take place either by means of attached units intended to be installed after production of the basin of the pool, or by means of units intended to be integrated with the panels constituting the basin of the pool.

The problem which the invention proposes to solve is that of providing an assembly allowing the suction and discharge of the water in a pool basin in conjunction with filtration means which can, as desired, either be attached after the production of the basin of the pool or be incorporated at the time of production of the basin of the pool.

In order for this type of unit to be able to be attached, either straddling the walls of the basin of the pool or integrated with the panels constituting the basin of the pool, it was necessary to solve the important problem of leaktightness between the pumping and filtration compartments, it being emphasized that it is out of the question for the water located in the immersed filtration compartment to be able to pass into the outside compartment accommodating the pumping means.

Specifically, although the problem of leaktightness is less important in the case of a unit intended to straddle the walls of the pool, this is not so if that same unit is intended to be mounted in juxtaposition with the adjacent panels of the basin of the pool. In the event that the unit straddles the walls of the basin of the pool, it is automatically raised by the presence of the suction and delivery pipes between the two compartments. In other words, the space separating the two compartments is located above the upper water level of the basin.

On the other hand, when the unit is mounted in conjunction with the adjacent panels of the basin of the pool, but without extending vertically above them, it is necessary to lower it by the distance corresponding to the height of the free space between the two compartments for the passage of the suction and delivery pipes. Such a free space is located very substantially at the level of the water in the basin with, consequently, obvious risks of water passing into the pumping compartment.

Thus, in Patent Application WO 96/12075, it is not possible completely to exclude the risk of water passing accidentally into the pumping compartment. In actual fact, there is no complete leaktightness between the filtration compartment and the pumping compartment. A space exists above the wall which separates the said compartments. This space is necessary in order to enable air to circulate freely so as to cool the pumping compartment.

SUMMARY OF THE INVENTION

Having regard to the stated problem to be solved and the constraints to be observed, this compact filtration unit for a swimming pool basin is noteworthy in that:

the two compartments transversely define a cross-sectional profile suitable for straddling the walls of the basin of the pool, the filtration compartment in communication with the water in the basin possesses arrangements for securing it to panels constituting the walls of the basin of the pool, the two compartments are separated by a leaktight wall to prevent the passage of the water from the filtration compartment into the pumping compartment, in such a manner as to make the said pumping compartment leaktight compared to the filtration compartment.

the separating wall possesses arrangements for leaktight connection to suction pipes and delivery pipes connecting the filtration means to the suction and delivery means;

the pumping compartment is in communication at its rear part with a duct which is in communication with the outside air;

the two compartments are sealed by a removable lid which possesses, at the level of the duct, a plurality of perforations in order to place the said duct in communication with the outside air.

Having regard to these arrangements, the result thereof is that the means of suction and delivery are therefore dry in the pumping compartment, ventilation thereof being provided by the duct and by the perforations formed within the thickness of the removable lid.

In order to solve the stated problem of perfect integration of the unit at the time of assembly of the panel of the basin, the lid is shaped at its end on the filtration compartment side to ensure continuity with the coping of the basin of the pool.

BRIEF DESCRIPTION OF THE INVENTION

The invention is explained in greater detail below with the aid of the figures of the attached drawings, in which:

FIG. 6 is a partial view, on a larger scale and in section, showing the leaktight connection arrangements on the separation wall.

DESCRIPTION OF THE INVENTION

Figure 1:
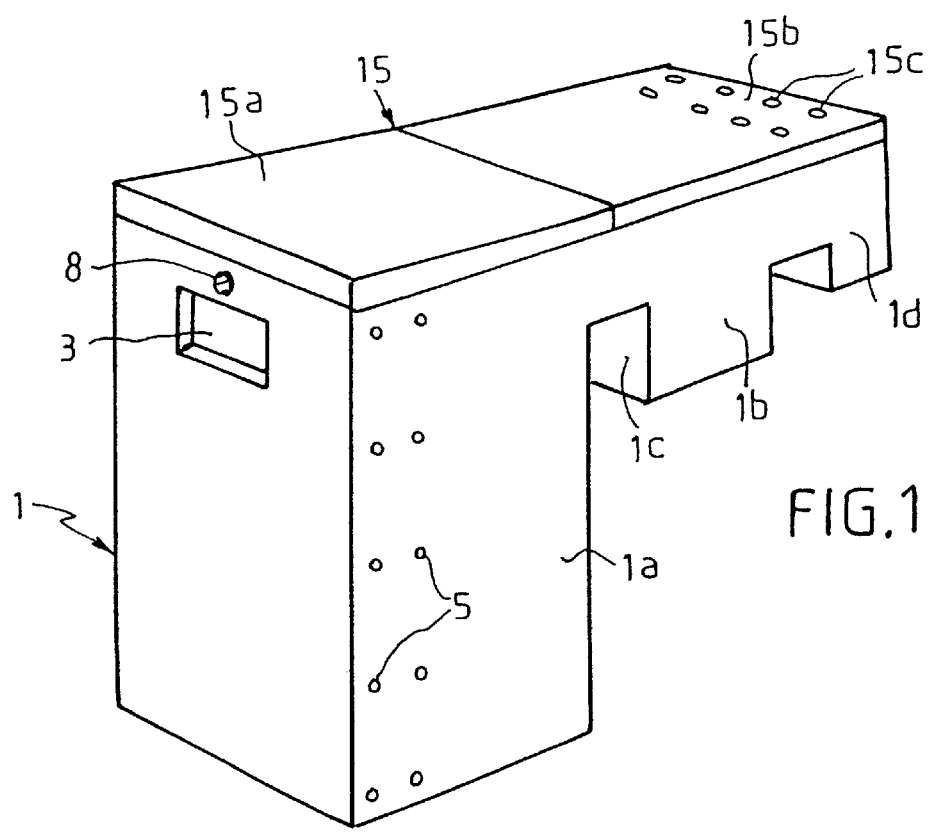
FIG. 1 is a perspective view of the mixed filtration unit according to the invention.
Figure 5:
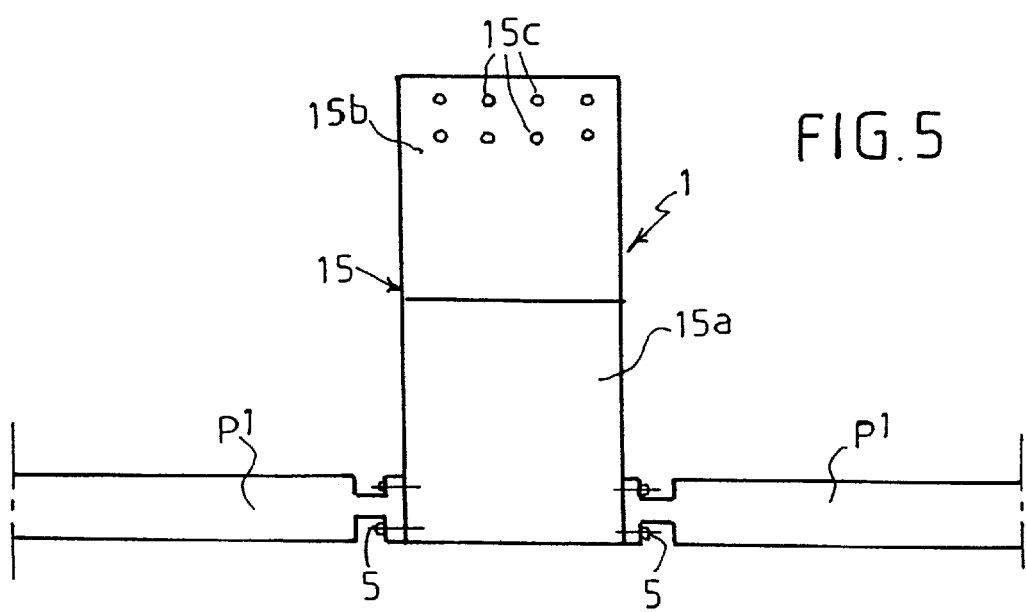
FIG. 5 is a view of the unit in longitudinal section.

In a known manner, the compact filtration unit, designated as a whole by (1), comprises two compartments (1a) and (1b) arranged adjacently and one behind the other. The compartment (1a) accommodates filtration means (2) of any known and appropriate type. This compartment (1a) is intended to be in communication with the water in the basin of the pool. This compartment (1a) possesses at least one inlet orifice or skimmer (3), disposed facially or otherwise, in order to allow the water to enter the compartment (1a) to be submitted, in a known manner, to the filtering power of the means (2).

The compartment (1b) accommodates means (4) in particular in the form of at least one pump, to permit the suction and delivery of the water in the basin of the pool, in conjunction with the filtration means (2). The compartment (1b) is intended to be positioned outside the basin of the pool.

As stated in the preamble, the compact filtration unit is shaped to enable it to be installed, as desired, either after complete production of the basin of the pool or at the time of production of that basin in order to be integrated with the panels constituting it. To this end, the two compartments (1a) and (1b) transversely define a sectional profile suitable for straddling the walls of the basin of the pool (FIG. 2), in order to enable it to be attached and positioned relative to the walls (P).

In the example shown, the two compartments (1a) and (1b) exhibit a free space (1c) corresponding very substantially to the thickness of the wall (P) of the basin of the pool, in order to enable the unit to be positioned astride the latter, thus making it possible to bury the pumping compartment (1b) while the filtration compartment (1a) is immersed in the water of the basin of the pool.

In accordance with another feature, the filtration compartment (1a) possesses arrangements for securing it to the panels (P1) constituting the walls of the basin of the pool. To this end, the opposite lateral faces of the compartment (1a) possess fixing pins (5) or the like capable of interacting with matching arrangements possessed by assembly fins of the panel (P1). The pins (5) may advantageously be recessed into the thickness of the lateral walls of the compartment (1a).

Figure 2:
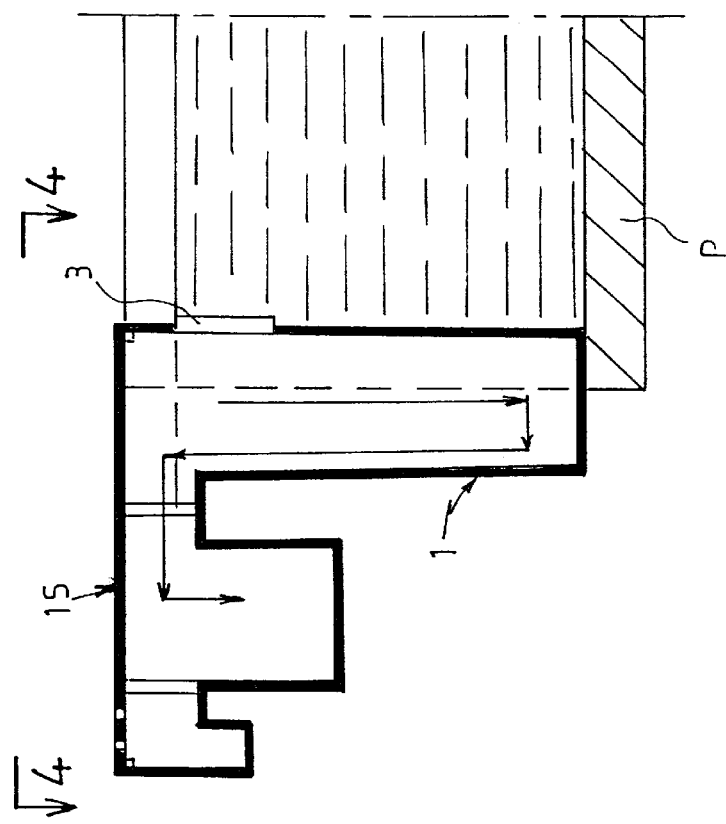
FIG. 2 is a schematic sectional view showing the assembly of the unit in a position astride one of the walls of the basin of the pool.
Figure 3:
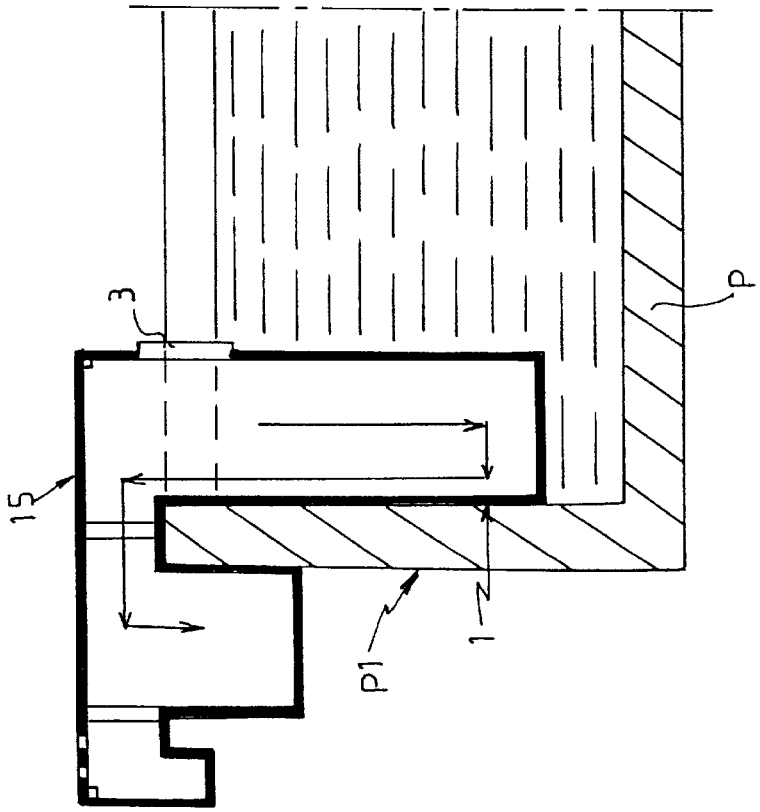
FIG. 3 is a schematic sectional view showing the assembly of the unit in position juxtaposed with the panels constituting the basin of the pool.
Figure 4:
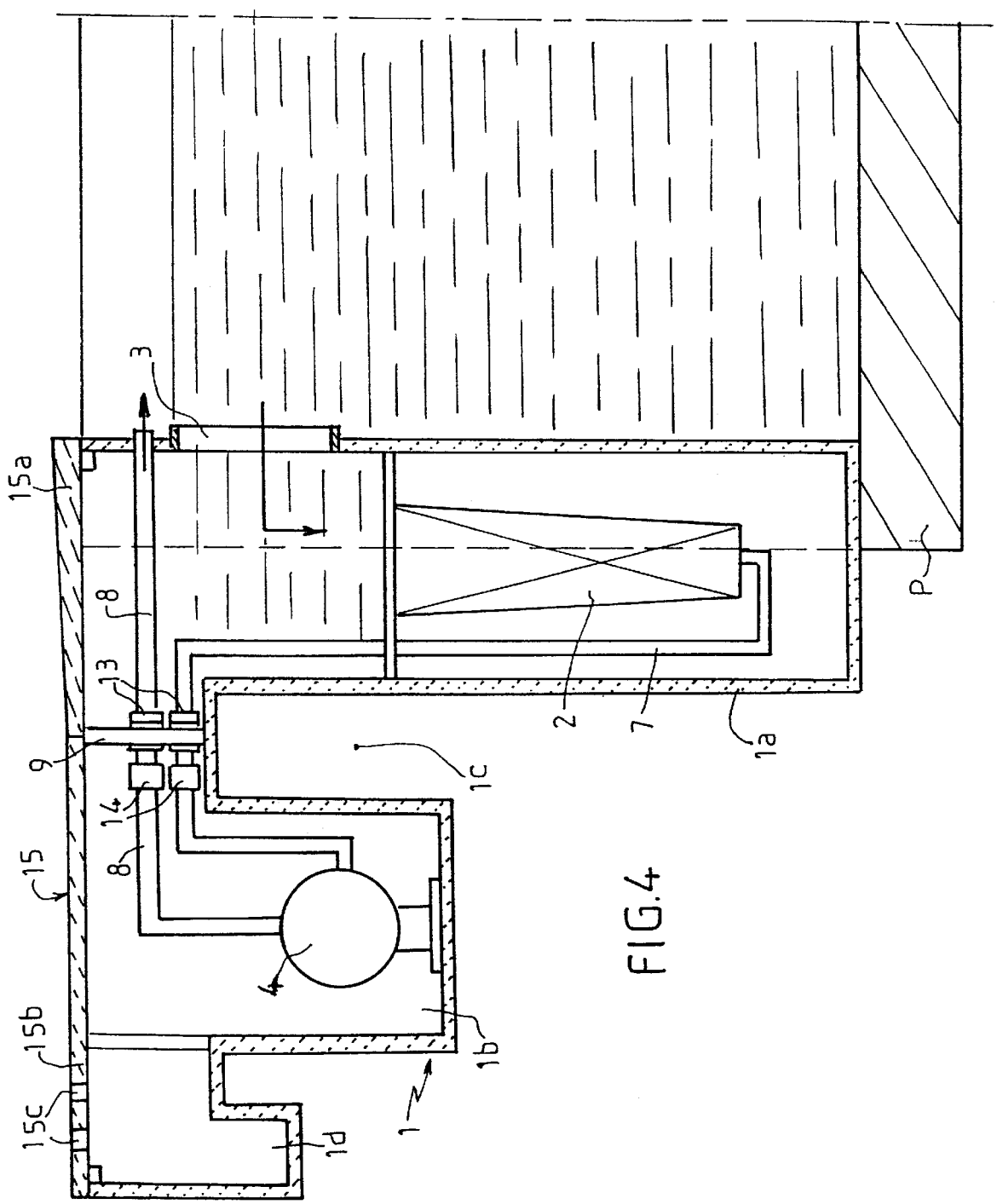
FIG. 4 is a sectional view taken along the line 4.4 in FIG. 3.

The result of this is that the unit (1) constitutes a mixed unit, given that it may be used either in the case of an existing pool (FIG. 2) or at the time a pool is produced (FIG. 3).

Having regard to this dual option, it is necessary to address the problem of leaktightness between the two compartments (1a) and (1b), in order to prevent the water contained by the compartment (1a) from being able to pass accidentally into the pumping compartment (1b). However, it is necessary to provide a communicating space (6) between the compartments (1a) and (1b), allowing the passage of the suction pipe (7) and delivery pipe (8). In the event that the entire unit is arranged astride the walls of the basin of the pool (FIG. 2), the problem of leaktightness between the two compartments is less important, given that, in this straddling position, the unit is raised, the communicating space for the passage of the pipes (7) and (8) being situated above the respective wall of the basin of the pool (FIG. 2). However, this is no longer the case if the entire unit is intended to be installed juxtaposed with the panels (P1) constituting the basin of the pool. In this case, the unit is lowered by a height corresponding to that of the communicating space (6). In other words, given the same level of water in the basin of the pool, this water will tend to pass through the communicating space (6).

Having regard to this important problem of controlling the water level in the basin of the pool, with the objective of being able to keep it at its maximum whatever the positioning of the filtration unit as a whole, that is to say whether straddling or integrated, the two compartments (1a) and (1b) are separated by a leaktight wall (9) in order to prevent any accidental passage of the water from the filtration compartment (1a) into the pumping compartment (1b). This wall (9) possesses arrangements for leaktight connection to the suction pipe (7) and the delivery pipe (8) connecting, as shown, the filtration means (2) and the pumping means (4).

As is shown more particularly by FIG. 6, the connection arrangements are constituted by a sleeve (10) which passes through the leaktight wall (9). This sleeve (10) possesses a support collar (10a) interacting with one of the transverse faces of the wall (9) and, on the other side of the said wall, the sleeve (9) possesses a washer (11) capable of bearing against the other face of the wall (9) in conjunction with a seal (12) under the action of a clamping nut (13). The two ends of the sleeve (10) possess arrangements for the suction and delivery pipes (7) and (8) which are in two distinct parts (7a–7b) and (8a–8b). For example, the part of the pipes (7a) and (8a) connected to the pump are connected at the corresponding end of the sleeve, by means of a leaktight clamping collar (14) possessing a gasket (14a) which is ribbed to interact with a matching circular ribbing (10b) on the sleeve (10).

On the other side of the leaktight wall (6), the other parts (7b) and (8b) of the suction and delivery pipes are solidly fixed to the bore (10c) of the sleeve, in particular by adhesive bonding (FIG. 6).

Having regard to the leaktightness of the pumping compartment (1b), it is necessary to arrange for its cooling in order to avoid any heating of the motor of the pump. To this end, the pumping compartment (1b) is in communication, in its rear part, with a spout (1d) communicating with the outer air. The two compartments (1a) and (1b) are sealed by a lid (15), in particular in two parts (15a) and (15b), corresponding to the suction compartment and to the pumping compartment, including the spout (1d).

Having regard to the stated problem of the ventilation of the compartment (1b) and the establishment of communication between the spout (1d) and the open air, the part of the lid (15b) possesses a plurality of perforations (15c) in the area of the said spout (1d).

In accordance with another feature, the lid (15), more particularly the part (15a) situated on the side of the filtration compartment, is shaped in order to ensure continuity with the coping of the basin of the pool when the whole unit is fixed in conjunction and continuity with the various adjacent panels constituting the basin of the pool.

Clearly, the whole of the compact unit as defined in accordance with the features of the invention is capable of possessing any type of commonplace layout such as a step of a flight, floodlight, access ramp, etc.

The advantages are clearly apparent from the description; in particular, it is emphasized and recalled that the filtration unit can be used, as desired, either as an attachment to the walls of an existing pool basin or as an assembly in conjunction and continuity with the panels constituting the basin of the pool.

What is claimed:

1. A compact filtration unit for a swimming pool having a water basin, said unit including, a filtration compartment containing filtration means for receiving water from said basin and treating said water, a pumping compartment containing pumping means for drawing water from said filtration means and returning said water to said basin, said pumping compartment being mounted behind said filtration compartment and being connected at its upper section to an upper section of the filtration compartment by a passageway, said pumping compartment having a front wall that is separated from a back wall of the filtration compartment by a given distance whereby the compartments can straddle a wall of said basin with the passageway lying on top of said basin wall, a water-tight wall mounted in said passageway for preventing the passage of water from the filtration compartment into the pumping compartment, a delivery line passing through said water-tight wall for bringing water from said filtration means to said pumping mean, a supply line passing through said water-tight wall for returning water back to the basin, sealing means for providing a leak-tight joint between the delivery and supply lines and the water-tight wall, a duct compartment mounted adjacent to and in communication with the pumping compartment, each compartment having a top edge that lies in a common plane, and a removable lid for covering the compartments, said lid having a series of perforations over the duct compartment wherein the duct compartment is in communication with the surrounding ambient.

2. The unit of claim 1 wherein the pump compartment has a front wall that compliments the shape of the basin wall and the desired spacing between the rear wall of the filtering compartment and the front wall of the pumping compartment is at least equal to the thickness of the basin wall.

3. The unit of claim 2 wherein said filtration compartment has front and rear walls that compliment the shape of the basin wall whereby the unit can be further or assembled as an integral part of a basin wall during erection of the pool.

4. The unit of claim 1 wherein said sealing mean for each pipe includes a sleeve that passes through said water-tight wall, gasket means for providing a leak-tight joint between said water-tight wall and said sleeves and means to join the lines to said sleeve.

* * * * *